US008838490B2

United States Patent
Quadracci et al.

(10) Patent No.: US 8,838,490 B2
(45) Date of Patent: Sep. 16, 2014

(54) ASSOCIATE MEMORY LEARNING FOR ANALYZING FINANCIAL TRANSACTIONS

(75) Inventors: Leonard J. Quadracci, Seattle, WA (US); Patrick N. Harris, Bonney Lake, WA (US); William G. Arnold, Jacksonville, FL (US)

(73) Assignee: The Boeing Company, Chicago, IL (US)

(*) Notice: Subject to any disclaimer, the term of this patent is extended or adjusted under 35 U.S.C. 154(b) by 1027 days.

(21) Appl. No.: 12/419,664

(22) Filed: Apr. 7, 2009

(65) Prior Publication Data

US 2010/0257006 A1 Oct. 7, 2010

(51) Int. Cl.
*G06Q 40/00* (2012.01)
*G06F 17/00* (2006.01)
*G06Q 30/02* (2012.01)

(52) U.S. Cl.
CPC ............... *G06Q 40/00* (2013.01); *G06Q 30/02* (2013.01)
USPC ........................................... 705/35; 235/375

(58) Field of Classification Search
None
See application file for complete search history.

(56) References Cited

U.S. PATENT DOCUMENTS

| | | | |
|---|---|---|---|
| 5,974,396 A * | 10/1999 | Anderson et al. | 705/7.33 |
| 6,925,460 B2 * | 8/2005 | Kummamuru et al. | 1/1 |
| 6,993,288 B2 | 1/2006 | de La Chapelle et al. | |
| 7,376,618 B1 * | 5/2008 | Anderson et al. | 705/38 |
| 2005/0222929 A1 * | 10/2005 | Steier et al. | 705/35 |
| 2008/0306944 A1 * | 12/2008 | Aparicio et al. | 707/6 |
| 2009/0083207 A1 * | 3/2009 | Aparicio, IV | 706/46 |

OTHER PUBLICATIONS

Indrajit Bhattacharya and Lise Getoor: "Relational Clustering for Multi-Type Entity Resolution" Proceedings of the Fourth International Workshop on Multi-Relational Data Mining (MRDM-2005) Aug. 21, 2005, pp. 3-12, XP-002584947.
Carlos Serrano-Cinca: "Self Organizing neural networks for financial diagnosis" Decision Support Systems, vol. 17, No. 3, Jul. 31, 1996, pp. 227-238, XP-002584948.
PCT International Search Report and Written Opinion for corresponding International Application No. PCT/US2010/026695, mailed Jun. 18, 2010, 10 pages.
http://www.saffrontech.com/saffron-enterprise.shtml—Saffron Technology, Inc., Feb. 10, 2009, 4 pages.
http://www.sra.com/netowl/—NetOwl Entity Extraction and Text Mining Tools, Feb. 10, 2009, 2 pages.

* cited by examiner

*Primary Examiner* — F. Zeender
*Assistant Examiner* — Denisse Ortiz Roman

(57) ABSTRACT

A method for analyzing transaction information that involves storing each one of a plurality of transactions in an associative memory with an associated cluster identification number. A given one of the transactions is selected for analysis, the given one of the transactions having a specific cluster identification number. An entity analytics engine is used to search and obtain a first subplurality of transactions from the associative memory that are similar to the given transaction by having a common attribute or entity and assigning each of the transactions a similarity score. Each one of the transactions is further analyzed to determine if it would be beneficial to form a formal transaction relationship with an organization involved with at least one of the transactions of the cluster.

15 Claims, 5 Drawing Sheets

| Transaction Number | Credit Card/ Financial Institution | Vendor Involved | Description | Cluster # | Date | Location | Dollar Total |
|---|---|---|---|---|---|---|---|
| 4562341 | XYZ Credit Card | GGG Hotels | Hotel expense | 000527 | 1.10.08 | St. Louis, MO | $2436.52 |
| 0342735 | ZGB Credit Card | XBJ Rental Cars | Car rental | 000125 | 3.06.08 | Seattle, Washington | $246.59 |
| 4683421 | ABC Bank | ZTG Photocopying Services | Paper | 000037 | 4.10.08 | Seal Beach, CA | $226.55 |
| 0002456 | ZZZ Financial | TTT Airlines | Express freight | 000236 | 11.15.08 | Troy, MI | $1472.87 |
| 0445735 | ZGB Credit Card | XBJ Rental Cars | Rental Car | 000125 | 3.06.08 | Seattle, Washington | $246.59 |

FIGURE 2

ASSOCIATE MEMORY LEARNING FOR ANALYZING FINANCIAL TRANSACTIONS

FIELD

The present disclosure relates to associative learning memory systems, and more particularly to an associative learning memory system that utilizes entity analytics to analyze financial transactions and to assist a user in identifying various ad-hoc business relationships that may advantageously be formalized to the benefit of one or both of the buyer and the seller involved with the transactions.

BACKGROUND

The statements in this section merely provide background information related to the present disclosure and may not constitute prior art.

A present day challenge is the ability to rapidly and accurately identify similar and repeating, but "ad hoc" financial transactions in complex systems based on large scale databases. Such databases may contain a large plurality of credit card transactions, often thousands, millions or more such transactions. In addition, such databases often contain textual content that is input by a large number of different agents, so differences in documentation approach, the vernacular used, and even the various terms used in describing the transaction or parties to the transactions are very common. Still further, related financial transaction information may be contained in more than one database of a given organization and the data may be incomplete. Thus, there exists a continual challenge to extract useful, actionable information from large volumes of current and historical free text data, which leads to a multitude of correlation issues that add to the complexity of the financial activity analysis. This may result in a large variety of computational and analytic challenges when attempting to analyze financial transaction data. The usual result is long analysis mitigation times which may lead to high costs when attempting to have individuals manually analyze large amounts of financial transaction data. Such activity may be expensive, burdensome and unacceptable for many businesses and governmental operations. Thus, the existence of these ad hoc business relationships may only rarely be discovered through manual analysis of financial transaction information because it simply takes too much time, or is too costly, to have individuals attempt to obtain such information from existing databases.

Further to the above, manual analysis by individuals may sometimes take months to accomplish and often require a team of experts, which may also introduce inconsistencies in the analysis results provided. Tools that the human analysts may use may be rules-based models, relational databases and query systems, and data mining systems.

Existing systems also may be limited in the ability to use whole text capture and are thus limited in their ability to relate entities in a complex and subtle manner. An entity may be defined as a data element that has its own set of attributes or descriptors, for example cities, cars, specific financial institutions, etc. Modern data mining solutions are typically reductive and may lose a substantial amount of valuable information during a searching process. These reductive solutions also tend to lose the subtleties of the data that often may be key to determining desirable patterns that do not repeat often. Modern data mining solutions may also be time consuming and costly in terms of manpower hours, as well as processor intensive.

With many present day financial transaction databases, much of the valuable association data between transactions can also be lost because the analyst may be "forced" into characterizing a transaction, during a computer assisted searching operation, by pre-defined characteristics. For example, many database systems have drop-down menus that allow the analyst to select only certain categories or certain words when performing searching activities. The predetermined categories may not contain enough detail to adequately address all the associations between transactions, therefore omitting relationships or details that can be of significant assistance in determining a desired result or that may assist in an analytical process. For example, a relational database might force a purchase to be described as "office furniture supplies" or "office software". Free text might describe the transaction as "office furniture layout program." Thus, in this example it would only be in the free text format that the true nature of the problem can be accurately described. Conventional rules based database systems can also be difficult to adapt or modify to accommodate to changing business conditions.

If an organization has repeating purchases from the same vendor it may be advantageous to establish a formal relationship with the vendor. This has the advantage that each party can negotiate terms to the best value of both parties. Furthermore, such a negotiated business arrangement may reduce costs to both parties, especially if the standard credit card transaction fee imposed on the seller can be reduced.

In the example of ad hoc financial transactions, sometimes purchases are made by an organization with a credit card by an individual employee of the organization. However, it may be more advantageous to the organization, either for cost reasons or other reasons, if the purchase was made with a purchase order. These instances can be difficult to find because the individual purchaser may not be motivated to formalize the relationship with the seller from which the purchase was made. Or the seller may prefer the ad hoc credit card transactions with various individuals of the organization because this allows the volume of sales to the organization to be more easily shielded, or so that terms of the sale can be unilaterally set by the vendor. This may make it more difficult for the organization to identify those sellers with which it would otherwise seek to negotiate volume discounts with. Re-occurring payments for parking, office supplies and software purchases may be undetected by the existing systems but may be actually form significant, re-occurring credit card purchases that are difficult or impossible to detect from a larger plurality of transactions.

The existing rules based systems may also be inherently limited by the irregular payment schedules across a timeline that is associated with payment on a transaction. Existing rules based systems may also be inherently limited by inadequate categorical association and free text characterization that differs across organizational boundaries and by the sheer number of transactions that must be analyzed to spot re-occurring transactions.

Existing relational database manipulation tools may be able find keywords, but the perspective is typically that of the relational database designer, not the individual that relates to the current situation or transaction. Relational databases often do not account for all the entities that are mention in a free text query by a user, and may also fail to understand those characteristics that make the transactions uniquely similar, or dissimilar.

As a further example to the challenges associated with analyzing ad hoc business relationships and the detection of such relationships using conventional relational databases, consider the limitations that may be imposed by some conventional systems involving split payments via a credit card. Split payments with a credit card may be prohibited by both business transaction process documentation. Split payments for computing equipment, office furniture and software purchases may go undetected by present day systems but readily recognized as significant, split credit card purchases when aggregated.

Some present day systems involve attempting to categorize all credit card transactions into a relatively large plurality, (e.g., 100-300) different bins using a rule-based approach. The bins are then individually analyzed looking for repeating transactions. The challenge with this approach is that there may be hundreds or more of such bins, with each bin containing thousands or more credit card transaction entries. And to complicate matters further, many times related transactions are placed in different bins because of the limitations of rules-based system that is being used to categorize or organize the transactions. Still another challenge with the above-described human centric approach is that humans often times bias searches by not being consistent across a time line when it comes to the terminology being used to query across large databases for given types of information.

SUMMARY

In one aspect the present disclosure involves a method for analyzing transaction information. The method may involve storing each one of a plurality of transactions in an associative memory with an associated cluster identification number. A given one of the transactions may be selected for analysis, the given one of the transactions having a specific cluster identification number. An entity analytics engine may be used to search and obtain a first subplurality of transactions from the associative memory that are similar to the given transaction by having a common attribute or entity, and each of the first subplurality transactions may be assigned a similarity score. Each one of the transactions in the first subplurality may be further analyzed to determine if the transactions each have a similarity score that meets a criterion indicating an increased degree of similarity with the given transaction, and the specific cluster identification number may be assigned to those ones of the transactions that meet the criterion. Ones of the transactions that have been assigned the specific cluster identification number may be grouped in a cluster with the given transaction. The transactions in the cluster may be analyzed to determine if a formalized transaction arrangement will be beneficial to form with an organization involved with at least one of the transactions of the cluster.

In another aspect the present disclosure relates to a method for analyzing financial transaction information. The method may comprise assigning each one of a plurality of financial transactions a unique cluster identification number for each of the financial transactions involving an entity. Each of the financial transactions may be stored in an associative learning memory along with a unique cluster identification number. For a given one of the financial transactions having a given cluster identification number, an entity analytics engine may be used to search the associative learning memory to obtain those ones of the financial transactions that have a first degree of similarity to the given financial transaction by virtue of sharing common attributes or entities. Those ones of the financial transactions that have the first degree of similarity may be grouped as a subplurality. Each of the financial transactions included in the subplurality of financial transactions may be analyzed to determine which ones thereof meet a predetermined criterion that indicates an increased degree of similarity with the given transaction. Those ones of the financial transactions that meet the predetermined criterion may be grouped together as a cluster with the given financial transaction. A new cluster number may be assigned to each one of those ones of the financial transactions of the cluster that is identical to the given identification cluster number of the given one of the financial transactions. The financial transactions of the cluster may be analyzed to determine if a formalized transaction relationship should be formed with at least one organization involved with at least one of the financial transactions grouped in the cluster.

In another aspect the present disclosure relates to an apparatus for analyzing transaction information. The apparatus may comprise a database for holding transaction information; an associative learning memory in communication with the database; a data mining tool for analyzing the transaction information stored in the database to populate the associative learning memory with a plurality of entities related to financial transaction information by a plurality of entities; and an entity analytics engine for performing searches of the associative learning memory in response to a search input from a user concerning a specific, given one of the financial transactions, and further adapted to identify a first subplurality of the financial transactions stored in the associative learning memory that have a first degree of similarity to the specific, given one of the financial transactions. A computer may be used that is adapted to assist in identifying and grouping together, in a cluster, those ones of the financial transactions in the first subplurality that meet a predetermined threshold that indicates an increased degree of similarity with the specific, given one of the financial transactions, and to group those ones of the financial transaction together in a second subplurality. The computer may also be used to group the financial transaction of the second subplurality together in a cluster with the specific, given one of the financial transactions. The computer may also be used to further analyze the cluster to determine whether a formalized transaction agreement should be formed with at least one organization associated with the financial transactions grouped in the cluster.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a diagram indicating the information associated with each entity stored in the associative learning memory;

DETAILED DESCRIPTION

Figure 1:
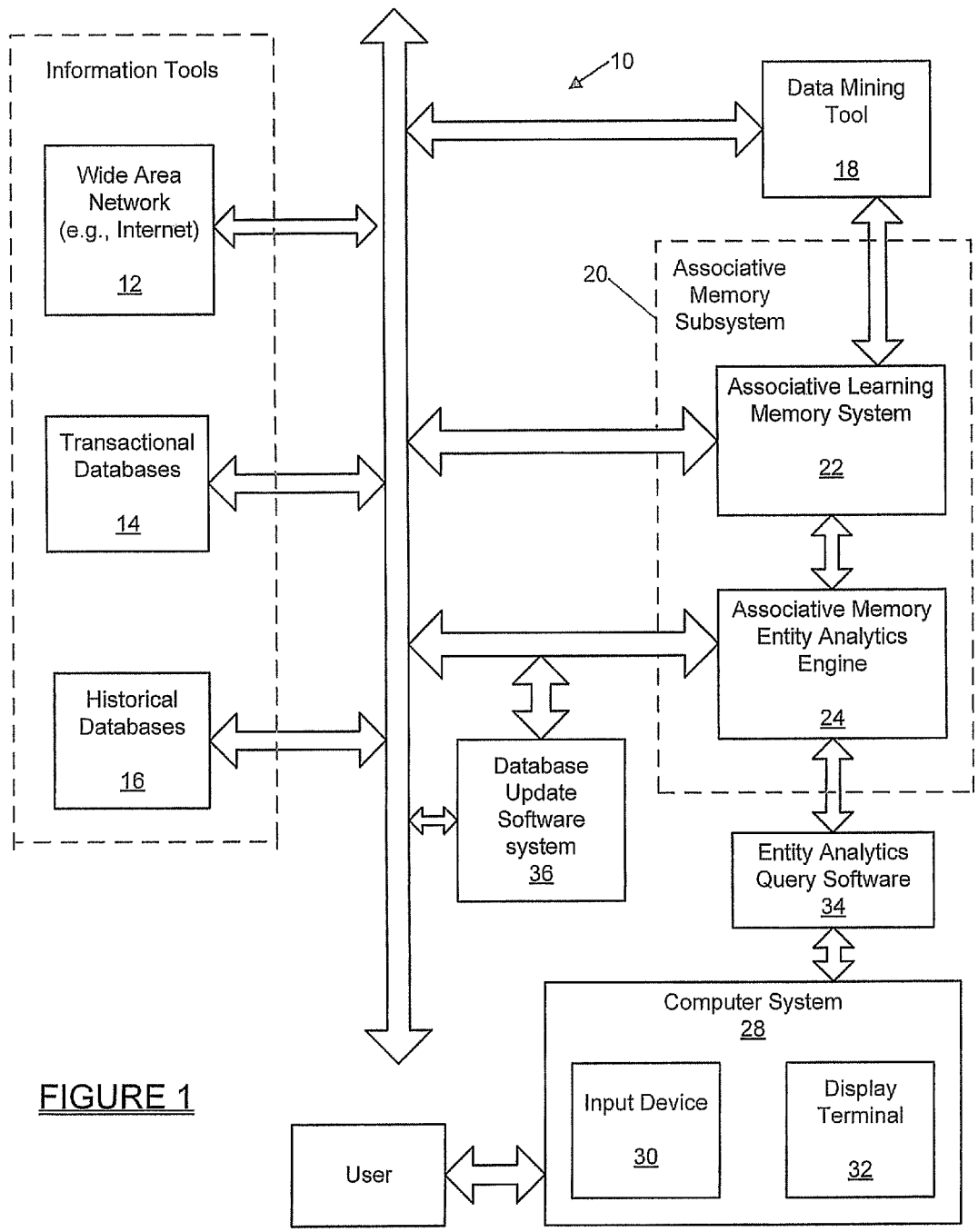
FIG. 1 is a block diagram setting forth one embodiment of a system in accordance with the present disclosure for assisting a user in performing an analysis of available financial transaction data.

The following description is merely exemplary in nature and is not intended to limit the present disclosure, application or uses. It should be understood that throughout the drawings, corresponding reference numerals indicate like or corresponding parts and features.

Referring to FIG. 1, there is shown one embodiment of a system 10 in accordance with the present disclosure for analyzing stored financial transaction information to assist a user in determining if formal transaction relationships or business relationships may be advantageous to form with selected organizations or businesses. However, it will be appreciated that the system 10 is suited for use in any application where one desires to identify similar or related types of transactions or repeating transactions with specific vendors or organizations, for example specific financial institutions. While the system 10 is especially well suited for analyzing large numbers of diverse financial transactions, the system is also expected to find utility in applications where the number of financial transactions and organizations involved is small or only moderately large, for example where only dozens or hundreds of transactions are involved.

Also, while the system 10 will be described in connection with analyzing financial transactions, it will be appreciated that the system is readily adaptable with little or no modification to handle virtually any type of transaction, service or activity that may be represented by a stored record or file, and where it may be helpful to an entity to identify repeating activity with one merchant, vendor or entity, or repeating types of transactions.

Referring to FIG. 1, the system 10 may include one or more independent information storage tools where various forms of financial transaction information may be stored. Three such exemplary information storage tools are illustrated as a wide area network 12 (for simplicity simply "web 12"), zero or more transactional databases 14 and zero or more historical databases 16. However, it will be appreciated that any type of database or information storage system capable of storing useful financial transaction related information may be used with the system 10. Transactional databases 14 may comprise one or more independent databases that are used to store financial transaction information. Such information may, for example and without limitation, be in the form of records of purchases by employees of an entity using a credit card from a specific credit card company. Records may also involve expense reports where an employee or other individual working for an organization used cash or paid by check to make a payment for a product or service while performing work for or on behalf of the organization. Examples of such financial transactions may include, without limitation, purchases of airline tickets, parking fees, car rental fees, cab fees, hotel fees, meals, photocopying fees, dry cleaning fees, office equipment, consulting services, parts, repairs or any fees for products or services that an individual incurs while performing work for or on behalf of an organization. Thus, such fees are not limited to just those involving travel expenses but may include, without limitation, fees relating to accounting services, engineering services, consulting services; payroll services, and products or supplies purchased, just to name a few.

Historical database 16 may be used to store historical financial transactions, for example credit card transactions or any other form or record of financial transaction, whether a cash, check or credit transaction that can be represented by a stored file. Such historical information may be, for example, any type of financial transaction that occurred more than a predetermined time before the present date, for example more than one year prior to the present date. The wide area network 12 may be used to provide access to some remote database or record storage device or site where transaction information is stored.

The system 10 is especially valuable for enabling a user to quickly search and identify transactions that may have some relation to one another. Such a relation may be repeated transactions using a particular type of vendor. Or the relation may be the same type of purchase, for example rental car services, from several different rental car companies. In either event, there may exist an opportunity for an organization to formalize a relationship with one or more entities for a given type of transaction, and thus provide the opportunity to reduce the cost of the service. For example and without limitation, identifying a large number of transactions between an organization and a vendor supplying services to the organization using a particular credit card may provide both parties with an opportunity to formalize their business relationship in a manner that provides a financial advantage to both the organization and the vendor. However, without the use of the system 10, simply identifying the purchases from a large database of diverse transactions could prove to be too costly and time consuming to be performed by individuals through routine database searching. Complicating this is that since transaction information will typically be entered by numerous individuals, differences in terminology, spelling and vernacular can further limit the effectiveness of conventional database searching that makes use of drop down menus with predefined search terms.

With further reference to FIG. 1 the system 10 also may include a data mining tool 18 and an associative memory subsystem 20. The data mining tool 18 may be in bidirectional communication with the information tools 12, 14, and 16, and also with the associative memory subsystem 20. The associative memory subsystem 20 may include an associative learning memory 22 (hereafter simply "associative memory 22") and an associative memory entity analytics engine 24 (hereinafter the "entity analytics engine 24"). A computer system 26 having a processor 28, an input device 30 and a display device 32 may communicate bidirectionally with the entity analytics engine 24. The input device 30 may be a keyboard or any other component suitable for allowing the user to input clustering parameters. The associative memory 22 is in bidirectional communication with the entity analytics engine 24. The entity analytics engine 24 may make use of one processor, but more typically a plurality of processors, that operate in connection with entity analytics query software 34 to perform queries for information stored in the associative memory 22. The entity analytics engine 24 receives cluster parameters from a user via the input device 30 and the query software 34 and controls the generation of entity clusters for the pertinent entity types for a given input controlled by the user. As will be explained more fully in the following paragraphs and in connection with the flowchart 204 FIG. 4, a clustering operation uses all the information associated with each entity of the user selected entity type to create clusters. Any such information is retrieved from the associative memory system 22. By the terminology "attribute" it is meant any piece of knowledge or characteristic such as adjectives, verbs, nouns (e.g., "cash", "credit", "check", "cab", "parking", "hotel", "paid"; "refund", "discount", "St. Louis", "December", "evening"), any entity or vendor name, any credit card company name or any bank name, etc. Thus, an attribute may essentially be any piece of textual information that might prove helpful in analyzing the contents of the associative memory 22 for specific types of transactions and/or the date, range of dates, or time of day that the transactions occurred.

A database update software system 36 may be used to update the information tools 12,14 and 16 with any documents created by the user, such as reports concerning a type of transaction being investigated or transactions with a particular vendor or organization. The entity analytics engine 24 periodically updates the associative memory 22 with new information retrieved from information tools 12, 14 and 16 so that the associative memory 22 will contain all of the entity information available to the system 10 when the system is next accessed for use by a user.

Prior to a first use of the system 10, a system designer defines at least one entity type, but more typically a plurality of entity types that relate to specific categories of information that may be used to help identify or evaluate a specific type of financial transaction. For example, one entity type might be "Credit Card Companies" and one entity might be a specific transaction with the "XYZ Card". Another example of an entity type could be "Vendor" and specific entities could be specific transactions with "ABC Car Rental", "BCD Car Rental", etc. Financial transactions are the most typical entity type. Entities of this type have attributes that include vendor, description, price, date, employee number, organization number, business expense report information. These entity types and entities are mapped and stored into the associative memory 22. The data mining tool 18 identifies a plurality of entities as it reviews all of the information available in the information tools 12, 14 and 16 and sends the identified information to the associative memory 22 for storage as independent entities. Thus, each specific entity type may have associated with it at least one, but more typically a plurality of different specific entities. Depending on the size of the organization implementing the system 10, dozens or more entity types may be defined by the system designer to identify point of views that may be useful in helping the user to analyze transactions of a certain type or with a certain vendor or entity, or during certain time periods, or involving certain costs. The command by the user for clustering by transaction entities may be input to the system 10 by the user via the input device 30 and the associative memory query software 34 will control the entity analytics engine 24 to search the associative memory 22 for transaction entities stored therein that are similar to each other and that form a cluster. An example of an entity analytics engine available commercially is "SAFFRON ENTERPRISE™" available from Saffron Technology of Morrisville, N.C. It will be appreciated that the entity analytics query software 34 will be constructed by the system designer to recognize those words, numbers or even characters that are important in the specific type of application that the system 10 is being used with.

The computer input device 32 may also be used by a user of the system 10 to input the type of entities that should be clustered. The ability to use all the free text in the transaction is a significant advantage of the system 10 because it enables all data defining the transaction or entity being investigated to be used in the analysis or clustering process. A single word or short phrase in the free text query that includes a verb, adjective or noun (e.g., "paid", "cash", "discount"", "ZEF Credit", "lodging", etc.) can represent an attribute that contributes to the entity analytics engine 24 finding related entities stored in the associative memory 22 that may help the user with his/her transaction investigation.

Another significant advantage of the system 10 is that it does not make use of reductive algorithms, which can actually eliminate some portions of input information that describe or characterize the transaction that could be helpful in identifying particular vendors, entities or types of transactions. Such reductive algorithms may typically categorize transactions or events into specific categories. This may result in relevant transaction information being overlooked or missed by conventional database systems because the system may not recognize or allow for the input of important words or phrases that may be relevant to the formation of a cluster. The system 10 provides the significant advantage that it allows the clusters to naturally form based on the data or the nature of the transactions not based on predefined set of categories. For example if a business in the year 1990 never contemplated that they would be purchasing MP3 players, then they would not have a predefined category for digital music players. However, the system 10 would remember that the term "MP3 player" was associated with a purchase and when another purchase was made of a "MP3 player" those transactions would be clustered together. This would be especially true if both transactions were from the same vendor or by the same organization or using the same justification in a Business Expense Report. This is a significant advantage of the system 10.

Referring now to FIG. 2, a high level diagram 100 is shown of what information might be stored as typical entities in the associative memory 22. Four exemplary entities 102-110 are shown. Each entity 102-110 may form a record or file that includes a plurality of fields for holding pertinent information pertaining to a given entity, which represents a specific transaction. For a given entity, such information may involve a specific entity number 112 assigned by the system 10; a field 114 where the name of the financial institution involved with the transaction is recorded, a field 116 where the name of the vendor or entity involved with the transaction is recorded; a field 118 for a description of the underlying expense; a field 120 for a "cluster number" assigned to the entity during the clustering process, a field 122 for the date that the transaction occurred, a field 124 for a location where the transaction occurred, and a field 126 for a dollar total for the transaction. It will be appreciated that any other information that may be pertinent to the transaction may be stored in the associative memory 22 with reference to its related entity number. As such, the foregoing fields 112-126 are only meant to represent examples of typical subject matter fields that are expected to be helpful in many applications to represent various types of information associated with each entity (i.e., transaction).

Figure 3:
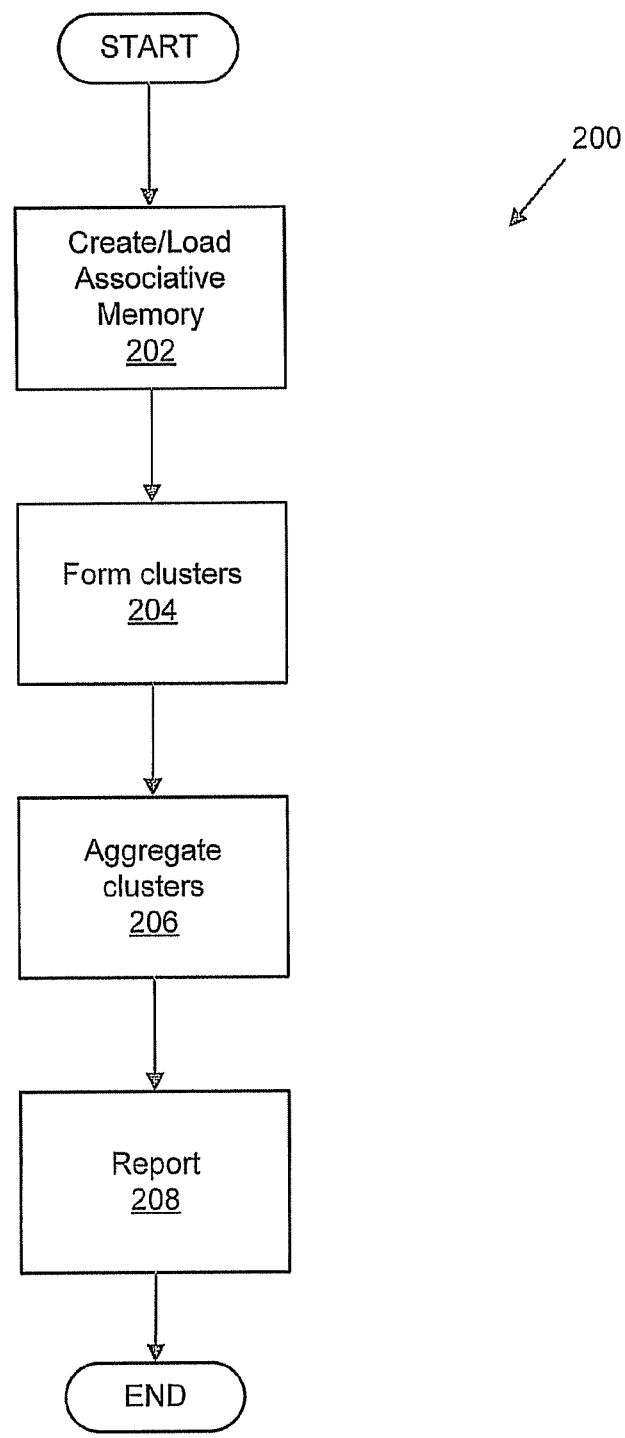
FIG. 3 is a high level flow chart of operations that may be performed in accordance with the present disclosure in analyzing and forming clusters of related financial transaction information that may be used by a user to assist in determining the existence of potential entity relationships that may be desirable to formalize.

Referring now to FIG. 3, a high level flow diagram 200 is shown that represents exemplary operations that may be performed by the system 10. Throughout the following discussion of FIG. 3, as well as FIGS. 4 and 5, the terms "entity" and "transaction" may be used interchangeably. This is because in the exemplary implementation described in FIGS. 3-5, a single transaction forms an entity and a single entity may be thought of as a single transaction between two parties.

Initially at operation 202 the associative memory 22 is loaded using the data mining tool 18. This involves obtaining transaction information in one or more of the databases 14 and 16, and possibly information obtained from a remote database or information source over the wide area network 12, and using the data mining tool to save each identified transaction in the associative memory 22 with a unique transaction number. The transaction number is stored in field 110

(FIG. 2). Various well known data mining tools exist for this purpose. For example, suitable data mining tools are available from SRA International, Inc. from Fairfax, Va. Any other related information such as the vendor involved with the transaction, the date of the transaction, the dollar total value of the transaction, and the location of the transaction may be extracted by the data mining tool 18 and stored in the associative memory 22.

At operation 204 the system 10 assigns every entity created at operation 202 to a cluster number. By "Form Cluster" it is meant that the transactions stored in the associative memory 22 are analyzed by the computer system 28 and entities meeting a predetermined threshold of similarly or some predetermined criterion indicating a desired level of similarity, are given the same cluster number. This cluster number is also stored in the associative memory 22 in field 120 (FIG. 2) as part of the record that forms each entity. At operation 206 the clusters are "aggregated". By "aggregated" it is meant that each of the transactions (or entities) associated with a cluster may be "summed" together so that the value of different clusters can be compared and the most valuable clusters can then be acted on by the organization. By the term "summed" it may mean, for example, the total dollar amount or the number of transactions in the cluster. This feature will be described in greater detail in the following paragraphs in connection with FIG. 4. At operation 208 a report may be generated that lists the aggregated cluster numbers with an indication as to the value or magnitude of the cluster.

Figure 4:
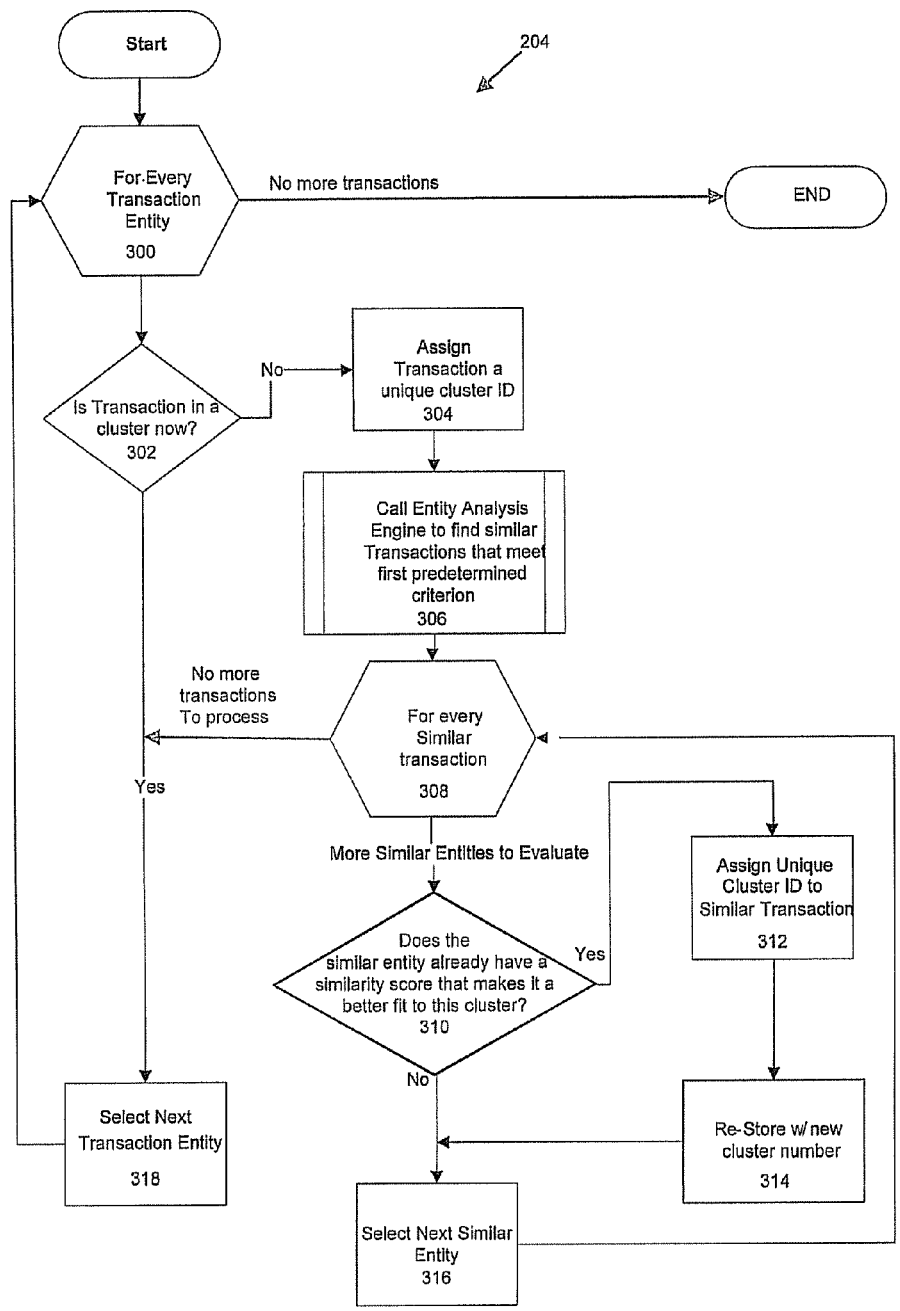
FIG. 4 is a more detailed flowchart of operations that may be performed in determining searching and forming clusters of similar or related entities representing similar or related financial transactions.

Referring now to FIG. 4, a flowchart is shown of exemplary operations that may be carried out in forming the clusters as mentioned for operation 204 of FIG. 3. At operation 300, a first entity (i.e., transaction) stored in the associative memory 22, is obtained and a check is made if the entity is assigned a particular cluster number, as indicated at operation 302. If the answer to the inquiry at operation 302 is "No", then the entity is assigned a unique cluster ID number at operation 304. The computer system 28 uses the entity analytics software 34 to call the entity analytics engine 24 to find all other entities representing transactions that are similar to the entity/transaction being processed, and assigns a "similarity score" to each obtained transaction. The similarity may be found if a given transaction shares common attributes or entities. This quantity of transactions may be thought of as a "first subplurality" of transactions. The specific criterion that the entity analytics engine employs to make the initial similarity determination may vary according to predefined rules to meet a specific application. For example, suitable programming of the entity analytics engine 24 may be made so that the entity analytics engine recognizes and associates only those entity types or attribute types that are significant to the cluster. In the case of financial transactions the date or time of the transaction is probably not important criteria for creating a cluster. Just because several financial transactions happen on the same date or on different dates but same time does not imply that there is a cluster purchases that identify an "ad hoc" business relationship. In this manner the entity analytics engine 24 may initially find all those transaction (i.e., entities) stored in the associative learning memory 22 that have at least a minimal degree of relevant similarity to the transaction which is the subject of a present search. The similarity score may be one or more additional predetermined criteria that indicate how close or relevant each one of the similar transactions is to the transaction being considered.

At operation 308, for every "similar" transaction collected at operation 306, a check is made at operation 310 to determine if the similar transaction is better associated with another cluster. If it has a similarity score that is better, for example a similarity score that is less than a second predetermined criterion, then the entity is left in it's existing cluster. If the similar transaction is better related to the current transaction, as indicated possibly by its similarity score meeting or exceeding the second predetermined criterion, then the same cluster identification number used for the transaction obtained at operation 304 is assigned to the similar transaction under present consideration, as indicated at operation 312, and the transaction is re-stored in the associative memory 22 with the new cluster identification number and updated similarity score, as indicated at operation 314. Thus, the similar transaction being considered is grouped together with the given transaction. The next similar transaction is then selected at operation 316, and operations 308-316 are repeated until every one of the similar transactions obtained at operation 306 has been analyzed and assigned a cluster identification number, or not if it is already in a better cluster. Any particular transaction that included a cluster number when originally obtained at operation 306, and that fits better with the current transaction at operation 310, will all have the same cluster identification number used for the transaction obtained at operation 304, which may be thought of as the "given transaction". Those ones of the transactions obtained at operation 306 that do not pass the test at operation 310 will keep their previously assigned cluster identification numbers. Thus, the transactions that meet the "more similar" test at operation 310 may be thought of as forming a "second subplurality" of transactions that are grouped together with the transaction at operation 304 with a common cluster identification number.

When all the similar entities have been checked at operation 308, then the next entity is obtained as indicated at operation 318, and operation 302 is repeated. If the check at operation 300 reveals that there are no more entities to process, then the routine in FIG. 4 ends.

Figure 5:
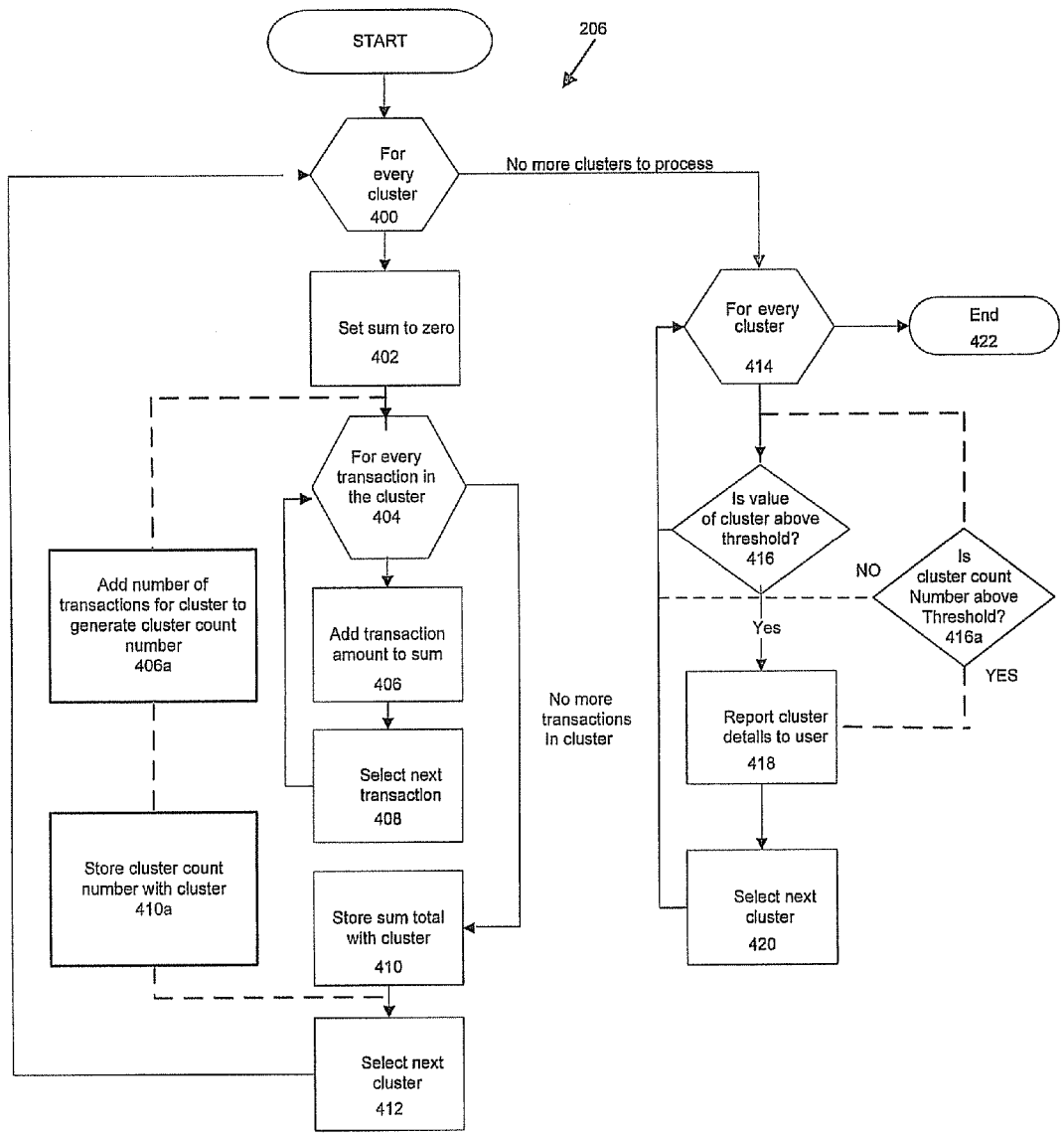
FIG. 5 is a flowchart of operations that may be performed in assigning a value or score to each cluster, with the value or score of each cluster being used to assist a user in determining whether a formalized transaction relationship may be advisable to entity into with a business represented by entities of a given cluster.

Referring to FIG. 5, a flowchart is shown setting forth operation 206 of FIG. 3, aggregating the value of each cluster, in greater detail. Initially at operation 400, a first one of the clusters formed in connection with the operations of FIG. 4 is obtained by the computer system 28. At 402 the "sum" value for the cluster is set to zero. At operation 404, for every transaction in the cluster a value of the transaction is added to the sum value for the cluster, as indicated at operation 406. At operation 408 the next transaction is selected. Operations 404-408 are repeated until all the transactions in the given cluster being analyzed have been obtained and processed, at which point a sum total is stored with the cluster in the associative memory 22, as indicated at operation 410. The next cluster is then obtained by the computer system 28. Operations 400-410 are then repeated for the next cluster identification number obtained. When the check at operation 400 reveals that no more clusters are available for processing, then a new loop is started at 414 to loop through every cluster again to determine if information about the cluster should be reported. A check is made to determine if the value of the cluster is above a second predetermined threshold or criterion, as indicated at operation 416. The threshold may be set at a value (or dollar amount) that makes sense to convert the cluster from an "ad hoc" business relationship to a more formal one. The lower the cost of developing a formal relationship the lower this threshold and the more clusters an organization can convert. Typically the sum is based on the dollar amount of the transactions so it is in the interest of the organization to "formalize" ad-hoc relationships that are above a certain value. For example the organization might determine that clusters above $10,000 should be evaluated for a more formal business relationship and those clusters with an aggregated value under $10,000 can be ignored. At operation 418 the details of the cluster may then be reported to the user by the computer system 28 via the display terminal 32. At operation 420 the next cluster identification number is retrieved for processing and operations 414-418 are repeated. When no further cluster identification numbers from operation 414 are available for processor, the method may be considered to be completed, as indicated at operation 422.

Thus, from the information reported to the user at operation 418, a user may be apprised of those clusters of entities that have a predetermined level of similarity, and that have a sum high dollar total that meets a predetermined threshold. This may indicate to a user of the system 10 that further investigation is warranted to determine if a formalized business arrangement should be formed with a given vendor or financial company that shows a high frequency of occurrence or high dollar amount.

Another way of analyzing the value of a cluster is simply to add the number of transactions in the cluster to obtain a cluster "count" number, as indicated at operation 406a in FIG. 5. If the user is interested in this then box 406a replaces 406, box 410a replaces 410 and 416a replaces 416. The cluster count number may then be stored with that cluster, as indicated at operation 410a. The test at operation 416 would then be replaced with test 416a that checks if the cluster count number for the cluster is above a predetermined count number. A "Yes" answer at operation 416a may identify the cluster as a high occurrence cluster that may indicate that a formalized business relationship with the vendor identified in the transactions of the cluster should be formed.

The ability of the system 10 to enable the user to rapidly search for and identify "ad hoc" business relationships from a large plurality of stored transactions can potentially result in significant financial savings to both parties of transactions that occur with a degree of regularity. The system 10 is especially useful in large scale applications where the sheer volume of financial transactions makes rapidly identifying cost-similar transactions difficult, time consuming or even impossible. The system 10 is applicable to virtually any scale commercial or governmental system or process, but its value increases significantly as the size and complexity of the system, process or product increases since the cluster identification process becomes exponentially difficult.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for analyzing transaction information, comprising:
storing each one of a plurality of transactions in an associative learning memory with an associated cluster identification number;
selecting a given one of the transactions for analysis, the given one of the transactions having a specific cluster identification number;
using an entity analytics engine to search and obtain a first subplurality of transactions from the associative learning memory that are similar to the given one of the transactions by having a common attribute or entity and assigning each one of the first subplurality of transactions a similarity score;
further analyzing each one of the transactions in the first subplurality of transactions to determine if any has a similarity score that meets a criterion indicating an increased degree of similarity with the given one of the transactions, and assigning the specific cluster identification number to those ones of the transactions of the first subplurality that meet the criterion, as a second subplurality of transactions;
grouping said ones of the transactions that have been assigned the specific cluster identification number in a cluster with the given one of the transactions;
analyzing all of the transactions in the cluster and determining a value for the cluster, the value being indicative of a degree to which it would be beneficial to establish a formalized transaction relationship with an organization involved with at least one of the transactions identified with the specific cluster identification number; and
further using the entity analytics engine to re-store ones of the transactions in the cluster in the associative learning memory with a new cluster number that matches the specific identification cluster number of the given one of the transactions.

2. The method of claim 1, wherein said storing each one of a plurality of transactions in an associative learning memory comprises storing each one of a plurality of financial transactions identified by a unique transaction number, in the associative learning memory.

3. The method of claim 1, wherein said analyzing the transactions in the cluster to determine if a formalized transaction arrangement with at least one organization will be beneficial to form comprises analyzing the transactions to determine if the formalized transaction arrangement with the organization should be formed.

4. The method of claim 1, further comprising:
comparing the value of the cluster to a predetermined threshold value; and
if the value of the cluster at least one of meets and exceeds the predetermined threshold value, then reporting the cluster as being of a sufficiently high value to warrant consideration as to forming the formalized transaction relationship with the organization.

5. The method of claim 1, wherein:
said analyzing all of the transactions in the cluster comprises summing a dollar amount involved in each one of the transactions grouped together in the cluster together to generate a dollar total for the cluster; and
comparing the dollar total against a predetermined dollar total to determine if the formalized transaction relationship with the organization should be formed.

6. The method of claim 1, wherein said analyzing all of the transactions in the cluster comprises:
counting the transactions grouped in the cluster to generate a total transaction count for the cluster; and
comprising comparing the total transaction count with a predetermined total transaction count value to determine if the formalized transaction relationship with the organization.

7. A method for analyzing financial transaction information, comprising:
assigning each one of a plurality of financial transactions a unique cluster identification number, each of the financial transactions involving an entity;
storing each of the financial transactions in an associative learning memory along with a unique cluster identification number;
for a given one of the financial transactions having a given cluster identification number, using an entity analytics engine to search the associative learning memory to obtain those ones of the financial transactions that have a first degree of similarity to the given financial transaction by virtue of sharing common attributes or entities, and grouping those ones of the financial transactions that have the first degree of similarity as a subplurality;

analyzing each of the financial transactions included in the subplurality of financial transactions to determine which ones thereof meet a predetermined criterion that indicates an increased degree of similarity with the given transaction;

grouping those ones of the financial transactions that meet the predetermined criterion together as a cluster with the given financial transaction;

assigning a new cluster number to each one of those ones of the financial transactions of the cluster that is identical to the given identification cluster number of the given one of the financial transactions; and analyzing the financial transactions of the cluster by determining a value for the cluster, and using the value to determine if a formalized transaction relationship should be formed with at least one organization involved with at least one of the financial transactions grouped in the cluster; and re-storing said ones of the financial transactions in the associative learning memory with their respective said new cluster numbers.

8. The method of claim 7, wherein determining a value for the cluster and using the value to determine whether a formalized transaction relationship should be established with the one organization comprises:

summing a dollar value involved with all of the financial transactions grouped into the cluster to obtain a total dollar value for the cluster; and comparing the total dollar value to a predetermined value to determine if the total dollar value at least meets the predetermined value.

9. The method of claim 7, wherein determining a value for the cluster and using the value to determine whether a formalized transaction relationship should be established with the one organization comprises:

summing the number of the financial transactions that have been grouped into the cluster to determine a total transaction count number that is associated with the cluster; and comparing the total transaction count number to a predetermined value to determine if the total transaction count number at least meets the predetermined value.

10. The method of claim 7, further comprising successively using the entity analytics engine to analyze each one of the financial transactions stored in the associative memory to determine similar transactions for every said one of the financial transactions.

11. An apparatus for analyzing transaction information, comprising:

a database for holding transaction information;

an associative learning memory in communication with the database;

a data mining tool for analyzing the transaction information stored in the database to populate the associative learning memory with a plurality of entities related to financial transaction information by a plurality of entities;

an entity analytics engine for performing searches of the associative learning memory in response to a search input from a user concerning a specific, given one of the financial transactions, and further adapted to identify a first subplurality of the financial transactions stored in the associative learning memory that have a first degree of similarity to the specific, given one of the financial transactions;

a computer adapted to assist in:

identifying and grouping together, in a cluster, those ones of the financial transactions in the first subplurality that meet a predetermined threshold that indicates an increased degree of similarity with the specific, given one of the financial transactions, and to group those ones of the financial transaction together in a second subplurality;

grouping the financial transactions of the second subplurality together in a cluster with the specific, given one of the financial transactions;

analyzing all of the transactions in the cluster and determining a value for the cluster, the value being indicative of a degree to which it would be beneficial to establish a formalized transaction agreement with at least one specific organization associated with the financial transactions grouped in the organization; and wherein the computer is adapted to command the entity analytics engine to re-store ones of the financial transactions in the cluster in the associative learning memory with a new cluster number that matches the cluster number of the specific, given one of the financial transactions.

12. The apparatus of claim 11, wherein the computer is adapted to determine the value for the cluster by analyzing the cluster and by summing the dollar value of the financial transactions grouped in the cluster to determine a total dollar value for the cluster.

13. The apparatus of claim 12, wherein the total dollar value is compared by the computer to a threshold dollar value to determine if the total value for the cluster is sufficient to warrant creating the formalized transaction agreement.

14. The apparatus of claim 11, wherein the computer is adapted to determine the value of the cluster by adding all of the financial transactions grouped in the cluster to determine a total transaction count number, wherein the total transaction count number is used to assist a user in determining if the formalized transaction arrangement should be created.

15. The apparatus of claim 14, wherein the computer is adapted to compare the total transaction count number with a predetermined threshold to determine if the total number of transactions of the cluster warrants investigation into creating the formalized transaction agreement.

* * * * *